United States Patent [19]
Van Gompel et al.

[11] Patent Number: 4,799,840
[45] Date of Patent: Jan. 24, 1989

[54] DRUM-RESTRAINING DEVICE

[75] Inventors: James Van Gompel, Fremont, Ind.; Jerry A. Hall, Bobcaygeon, Canada

[73] Assignee: NP Marketing Corporation, Neenah, Wis.

[21] Appl. No.: 921,827

[22] Filed: Oct. 22, 1986

Related U.S. Application Data

[63] Continuation-in-part of Ser. No. 400,425, Jul. 21, 1982, abandoned.

[51] Int. Cl.$^4$ .............................................. B65D 19/26
[52] U.S. Cl. ......................................... 410/42; 410/35; 410/36; 410/47; 410/94; 108/51.1
[58] Field of Search ................... 108/2, 51.1; 182/17, 182/108, 109, 111; 188/6, 7; 206/386, 511, 599; 211/49 R, 49.1; 248/188.1, 188.8, 346; 280/47.34, 47.35; 410/34–36, 42, 46, 47, 94–97, 121, 153; 414/498

[56] References Cited

U.S. PATENT DOCUMENTS

| | | | |
|---|---|---|---|
| 1,142,088 | 6/1915 | Greene | 108/55.1 X |
| 1,820,281 | 8/1931 | Leslie | 108/51.1 |
| 1,993,237 | 3/1935 | Barrett | 108/51.1 |
| 2,681,198 | 6/1954 | Gleaves | 108/51.1 |
| 2,767,898 | 10/1956 | Cramer | 182/109 |
| 3,102,648 | 9/1963 | Hughes | 280/47.34 X |
| 3,260,226 | 7/1966 | Norgren | 108/51.1 |
| 3,531,855 | 10/1970 | Spring, Jr. | 108/51.1 X |
| 3,538,861 | 11/1970 | Jurasek | 108/51.1 |
| 3,834,323 | 9/1974 | Weinmann | 108/51.1 |
| 3,993,344 | 11/1976 | Bennett | 410/36 |
| 4,039,047 | 8/1977 | Larson et al. | 182/111 |
| 4,103,857 | 8/1978 | Levenhagen | 108/51.1 X |
| 4,147,112 | 4/1979 | Green et al. | 410/94 |
| 4,317,645 | 3/1982 | Van Gompel | 410/94 |
| 4,338,053 | 7/1982 | Abel | 410/94 |
| 4,353,520 | 10/1982 | Jansson | 108/55.1 X |
| 4,529,345 | 7/1985 | Van Gompel | 410/42 |

FOREIGN PATENT DOCUMENTS

| | | | |
|---|---|---|---|
| 1031313 | 6/1953 | France | 188/6 |
| 1241565 | 8/1960 | France | 108/51.1 |
| 0576239 | 10/1977 | U.S.S.R. | 410/36 |

Primary Examiner—Johnny D. Cherry
Assistant Examiner—Scott H. Werny
Attorney, Agent, or Firm—Stefan J. Klauber

[57] ABSTRACT

A cargo restraining device suitable for restraining barrel-shaped containers or drums is disclosed, which includes a platform, which is spaced from the underlying supporting surface or floor, by horizontal supporting members which extend the length of at least the flat portion of the platform, so as to provide a raised deck for the containers. At one end of the platform, an upright or vertical frame is connected to the supporting members, to prevent the containers from falling off the platform. The other end of the platform can be rounded over to define a snub-nose; or alternatively the other ends of the horizontal supporting members can project beyond the platform (which is otherwise flat) and be rounded into snub-nosed portions. In consequence, should the drums shift or move, whereby damage might ordinarily occur, the chimes or rims of the drums tend to flow around the snub-nose (or snub-noses if defined at the supporting members) without any significant damage. Thus, the containers, instead of falling off when moved, gently slide about and off the snub-nosed portion or portions; and no abrupt discontinuous edges are encountered. At both ends of the horizontal support members, floor piercing members are provided, which are normally oriented to the floor piercing position, and firmly hold the platform in place. A strap may be placed around the containers, and secured at the ends to an upright frame, to further restrain movement of the drums on the platform.

10 Claims, 4 Drawing Sheets

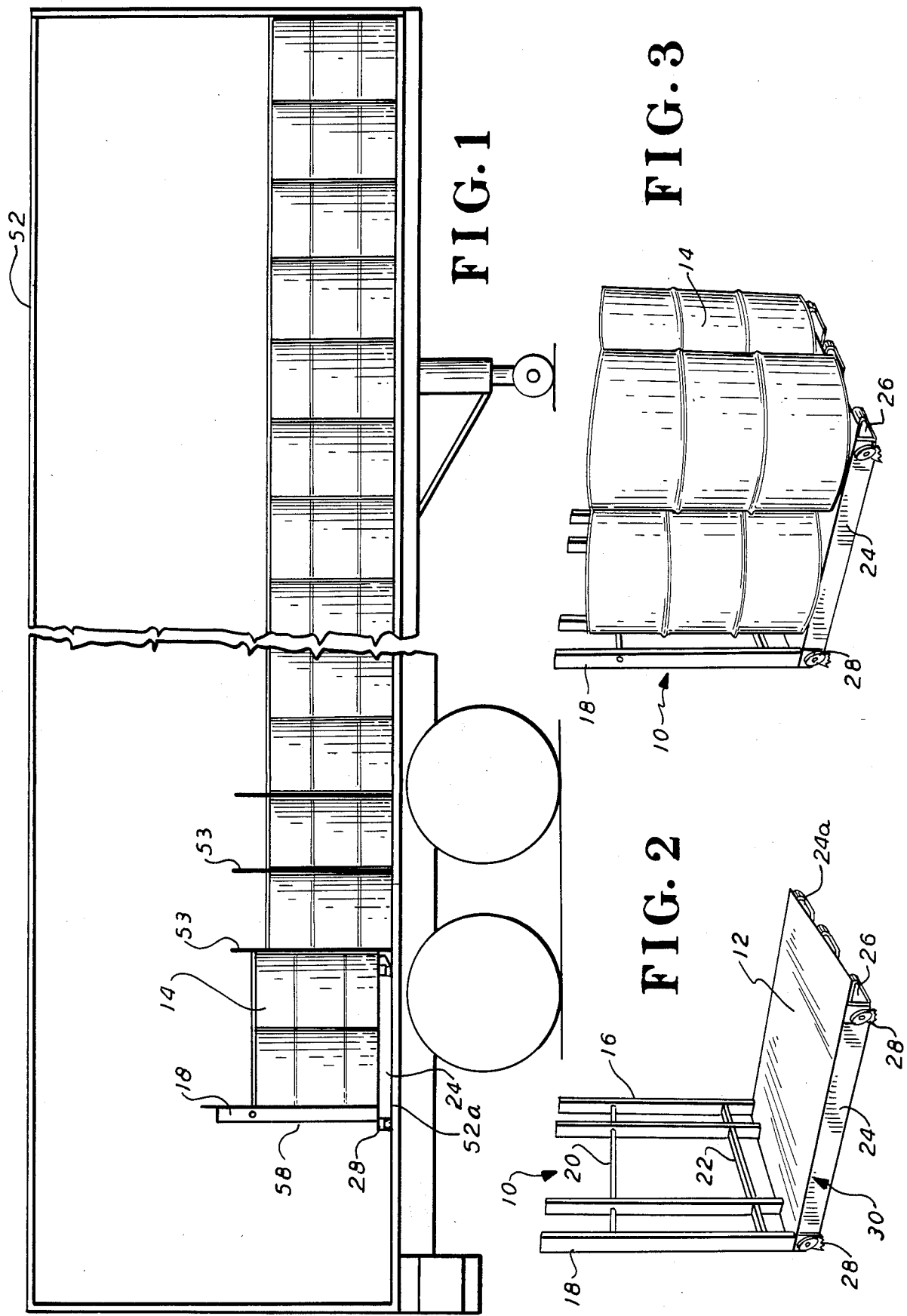

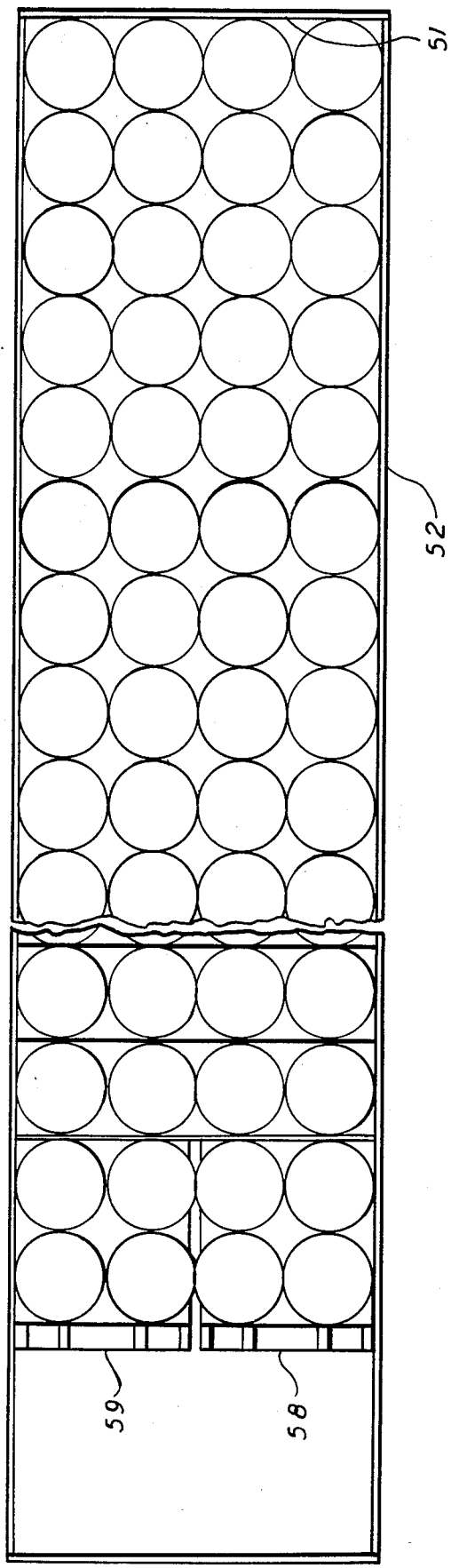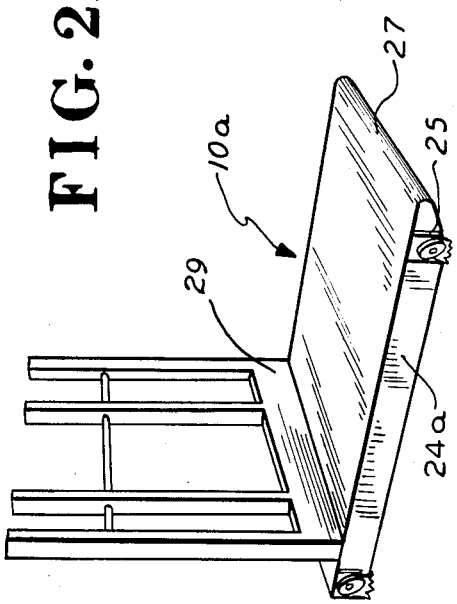

DRUM-RESTRAINING DEVICE

This application is a continuation-in-part of application Ser. No. 06/400,425, filed July 21, 1982 (now abandoned).

BACKGROUND OF THE INVENTION

This invention relates to a cargo restraining device and, in particular, to a device for storing and restraining barrel-shaped containers such as drums, to prevent damage during transportation thereof.

PRIOR ART

In order to prevent damage during transport to containers for explosive or hazardous materials, such as barrel-shaped containers or drums containing corrosive, volatile, or explosive liquids, such containers have in the past been braced to prevent movement of same. Where such containers are transported via railroad flat cars or truck trailers, procedures for installing such bracing commonly involve the use of one or more bulkhead boards which wedge the containers—with the assistance of tensioned steel strapping. Such procedures, however, are very time-consuming and costly to implement. Irrespective of such laborious efforts, movement of the load tends to occur, and if damage ensues, leakage of the hazardous liquid contents can lead to disastrous results.

In a U.S. application, Ser. No. 168,670, filed July 11, 1980, now U.S. Pat. No. 4,317,645, by the co-inventor herein, James Van Gompel, which application is commonly assigned with the present application, a device for restraining a cargo load has been described, which includes an elongated floor-contacting member provided with an upwardly facing load-bearing surface, and a generally upright member secured to the floor-contacting member in spaced relation from the forward end of the floor-contacting member, for engaging with the cargo load. A floor-piercing element is movably mounted on the floor contacting member adjacent to the rearward end thereof, and is normally disposed to pierce the floor when the floor contacting member is under load, to restrain movement of the load during transport.

U.S. Pat. No. 1,142,088 describes a load supporting rack specifically designed for use with hand trucks and having an open frame base and end wall with diagonal braces joining the lower end of the end wall to the base.

U.S. Pat. No. 1,559,827 describes a freight anti-creeping device including a metal plate for supporting cargo, cleats on the lower surface of the plate for gripping the floor, and a projection or lug on the other surface to which the cargo is secured.

U.S. Pat. No. 1,638,612 describes a cargo shipping device in which the cargo is braced on a platform and rigidly held in position.

U.S. Pat. No. 2,420,640 describes a demountable pallet crib for storing and handling pallets. Essentially, the pallets are enclosed in a frame which is assembled about the pallets. Between each end frame and an adjacent cheek frame interlocking means are provided so that the crib frame can neither bulge at the corners, nor collapse when heavily loaded.

U.S. Pat. No. 4,014,435 describes a collapsible rack for glass sheets, which has a base detachably secured to a pair of L-shaped supports, while a pair of struts is detachably secured to vertical portions of the L-shaped supports to support the articles in a vertical position. Banding is provided to unitize the glass sheets and the L-shaped supports to provide a stabilized rack.

None of the foregoing references provides a satisfactory solution to the problem of preventing damage during shipment to barrel-shaped containers or drums containing hazardous or explosive materials.

SUMMARY OF THE INVENTION

In accordance with the present invention, a cargo restraining device suitable for restraining barrel-shaped containers or drums is provided, which includes a platform at least the loadbearing part of which is flat, and which is spaced from the underlying supporting surface or floor, by horizontal supporting members which extend the length of at least the flat portion of the platform, so as to provide a raised deck for the containers. At one end of the platform, an upright or vertical frame is connected to the supporting members, to restrain the containers from falling from the platform. The other edges of the platform can be rounded over so that each defines a snub-nose; or alternatively the other ends of the horizontal supporting members can project beyond the flat portion of the platform and be rounded into snub-nosed portions. In consequence, should the drums shift or move, whereby damage might ordinarily occur, the chimes or rims of the drums tend to flow around the snub-nose (or snub-noses if defined at the supporting members) without any significant damage. Thus, the containers, instead of falling off when moved, gently slide about and off the snub-nosed portion or portions; and no abrupt discontinuous edges are encountered.

At both ends of at least the outermost of the horizontal support members, floor piercing members are provided, which are 'normally oriented to the floor piercing position, and firmly hold the platform in place.

In a further aspect of the invention, a strap may be placed around the containers, and secured at the ends to the upright frame, to further restrain movement of the drums on the platform.

In the preferred mode of use of the present device, a plurality of drums may be vertically loaded into a truck trailer, box car, or the like, with the first loaded row being placed against the front wall of the trailer. Plywood partitions or the like can be placed between some or all of the successive rows to space the rows and limit row-to-row drum contact. At the back end of the trailer, one or more of the present drum restraining devices are loaded with drums, and the resultant assembly or assemblies positioned against the plywood sheet opposed to the last row of drums. The devices are held in place by the floor-piercing members gripping the floor. The containers are securely held, yet some movement is permitted; and in the unlikely event of pronounced movement, as when a strap breaks, the containers can gently slide over or "flow" about the rounded snub-nosed end or edges of the restraining device without any serious damage to the said containers.

It is accordingly an object of the present invention to provide a cargo-restraining device for the transport of barrel-shaped containers, which requires no bracing, and which is otherwise highly effective in use and easily installed.

It is a further object of the invention, to provide a cargo restraining device for the transport of barrel-shaped containers, which allows limited movement of the containers to occur without consequent damage to same.

A still further obejct of the invention is to provide a cargo-restraining device for the transport of drums containing hazardous or explosive materials, which is easy to load and prevents damage to the drums during transport.

Another object of the invention is to provide a cargo restraining device for the transport of drums containing hazardous or explosive materials, which requires no associated braces or enclosures.

A further object of the invention is to provide a cargo restraining device for the transport of drums containing hazardous or explosive materials, which is easily transported, and readily placed for further transport in a vehicle.

These and further objects and advantages of this invention will appear from the description of the preferred embodiments, which are exemplary only, the invention both in its particulars and overall concept being defined in the claims following this specification.

BRIEF DESCRIPTION OF THE DRAWINGS

In the drawings:

FIG. 1 is a sectional elevational view of a loaded truck trailer showing a drum restraining device in accordance with the present invention in use; part of the drawing is schematic in nature;

FIGURE 1A is a top plan view of the truck trailer of FIG. 1;

FIG. 2 is a perspective view of a drum restraining device in accordance with the present invention;

FIG. 2A is a perspective view of a further embodiment of a drum restraining device in accordance with the present invention;

FIG. 3 is a view generally similar to that of FIG. 2, showing drums in place on the drum restraining device;

DETAILED DESCRIPTION OF THE PREFERRED EMBODIMENTS

Figure 2C:
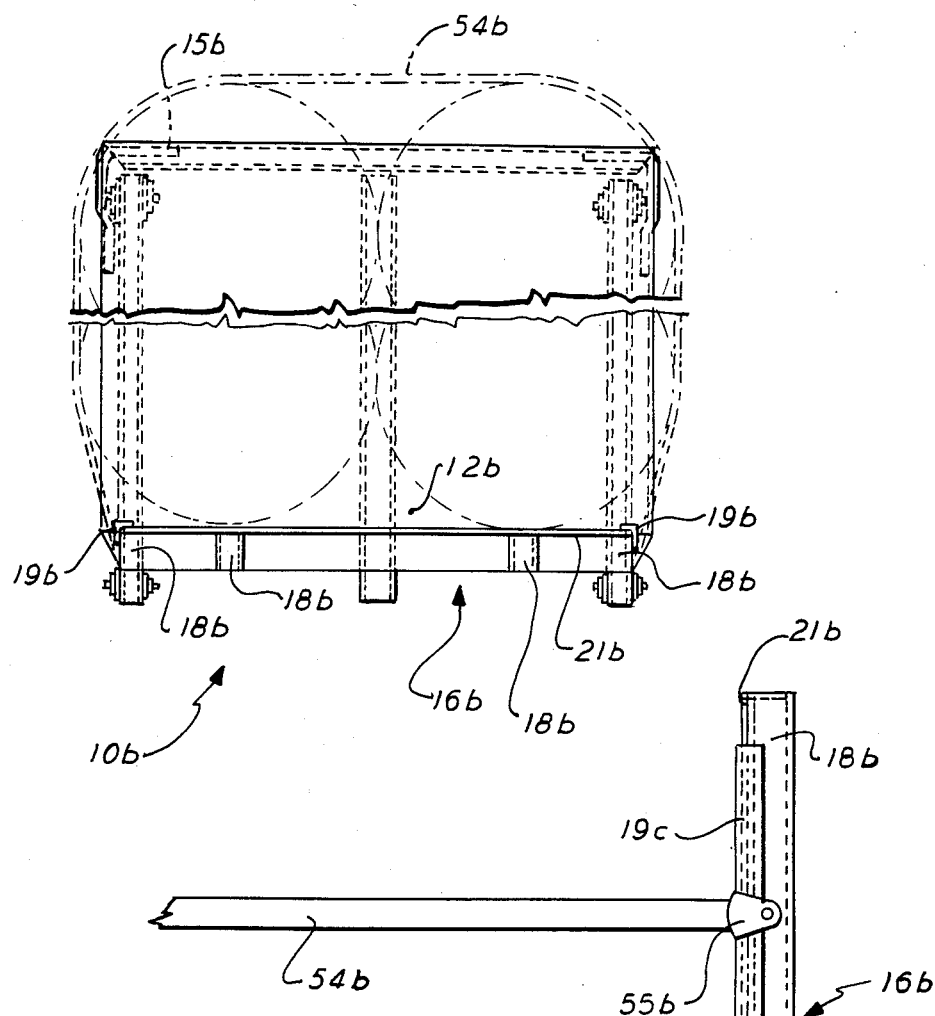
FIG. 2C is a top plan view of the embodiment of FIG. 2B.

Referring to the drawings, the drum retaining device 10 shown in FIGS. 2 and 3 has a deck or platform 12 on which drums 14 are placed (FIG. 3).

An upright or vertical frame 16 is joined to the rear end of platform 12. This frame generally comprises a plurality of spaced posts 18 which extend upwardly from platform 12 and are supported by cross-brace members 20 and 22.

Figure 4:
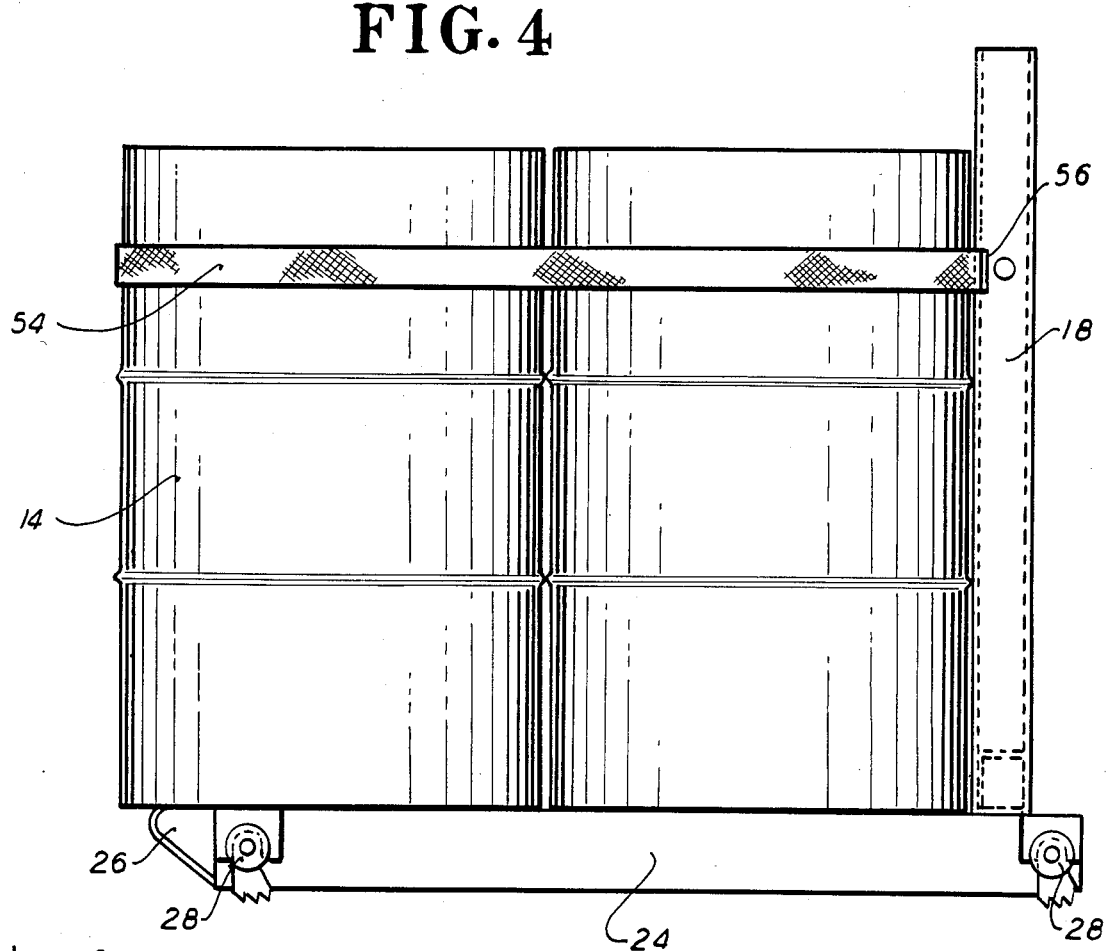
FIG. 4 is a side elevational view of the drums held in place on the drum-restraining device, as shown in FIG. 3, but with the restraining strap in place.

Platform 12 is supported and spaced from the floor by a plurality of horizontal stringer-like members or legs 24 to which the platform is attached. The forward ends of the legs 24, which project slightly from platform 12, are rounded into snub-nosed portions 26, as can be seen in FIGS. 2, 3, and 4, so that the drums, if moved, as by jarring from their secured positions (packed against frame 16), can slide or "flow" about the rounded portions 26, rather than encounter a sharp edge at which damage could occur. The rounded portions 26 similarly tend to protect drums not loaded on device 10 from being damaged. The height of the legs 24, which determines the spacing of platform 12 from the floor, is somewhat critical in that it must be sufficient to enable the drums to slide off the forward end of the platform, rather than fall; and yet, should not be so large that the drums would be damaged when they slide off. It has been found that a height of about 4 inches is preferable, which enables the drums to slide off the rounded ends rather than falling off.

In FIG. 2A, a further embodiment of the invention appears. The device 10a primarily differs from device 10, in that instead of including rounded portions 26 (as in FIG. 2), the members 24a each terminate at forward ends 25, and the platform 12 is in this instance formed into a rounded front portion 27 along its entire front edge. In this construction the rounded portion 27 is therefore continuous, and thus all the advantages of the separate rounded portions 26 are retained, and indeed enhanced. The device 10a also differs from device 10 in that an enlarged cross-member 29(FIG. 2A) replaces member 22 (FIG. 2) to provide greater stability and strength. In other respects device 10a is substantially identical to device 10, and the ensuing description may be regarded as applicable to either embodiment.

Figure 2B:
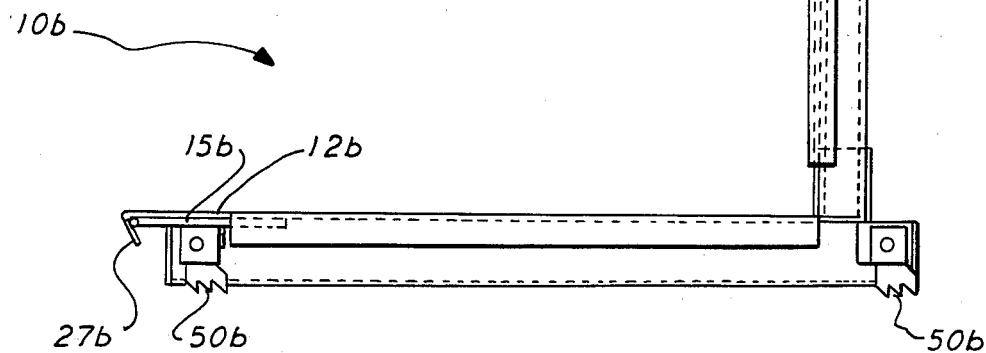
FIG. 2B is a side view of a modified form of the embodiment of FIG. 2A

In the modified form shown in FIGS. 2B and 2C, the device 10b has a platform 12b which not only is rounded and retroverted at its forward edge as seen at 27b but is also likewise rounded and retroverted at its side edges an L-shaped rod 15b completes the rounding of the platform 12b by having its ends inserted in the open spaces provided by the rounding of the front edge and the adjacent side edges of the platform at each corner of the front portion of the platform. The rounding is made possible by having front and side extensions of the edges of the platform which are thus rounded and retroverted.

As seen best in FIG. 2C, angle irons 19e are advantageously attached, as by welding, to the end posts 18b of vertical frame 16b in such a way as to leave a forward space or slot between the front surfaces of the end posts 18b and the adjacent surface of each angle iron 19b. Into this space is received a sheet, e.g. of plywood 21b, which thus overlies all of posts 18b across the back of device 10b and which gives the drums loaded on device 10b additional protection upon impact. As in the other embodiments, the two central vertical members 18c are spaced from the end members and from each other so that each is substantially on the theoretical vertical center line of the drums which the device 10b is constructed to receive, i.e. conventional 55 gallon drums, i.e. they lie substantially behind the bearing surface of each of the two end drums received on the platform. In practice, this places the center lines of the two central vertical members substantially 23 17/8 inches apart, thus giving the needed support for the drums under all conditions. This will be apparent from the phantom lines in FIG. 2C.

Figure 6:
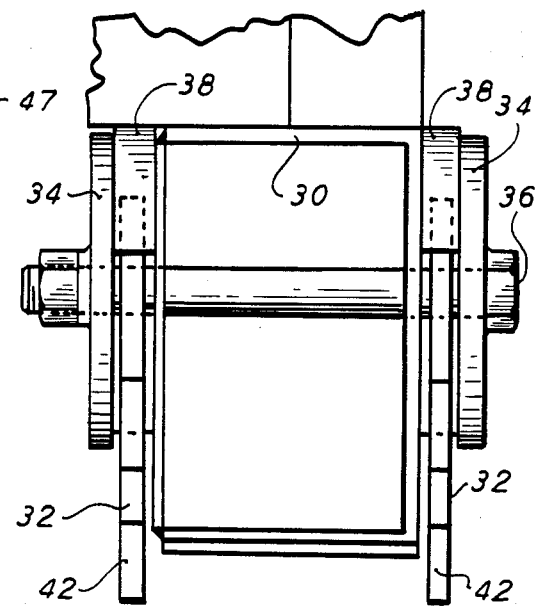
FIG. 6 is a detail view taken generally along the line 6—6 of FIG. 5.

At least the outer pair of legs 24 (i.e. the leg 24 and 24a) have at each end a floor piercing element 28 similar to those described in aforementioned application Ser. No. 168,670, filed July 11, 1980. In particular, each of the said outer supporting members 34 are formed as channel section members which open inwardly in facing relation as shown in FIGS. 2, 3, and 4. At either end of the outer supporting members adjacent to the upright post 18, a filler plate 28a extends across the channel to form a box section portion 30, as best shown in FIG. 6.

Each box section portion 30 of the respective outer leg 24 supports a pair of spaced pivotal members 32 to thus provide a total of eight (8) such members on the drum restraining device 10. The pivotal members 32 are each disposed on the legs 24 intermediate the leg and an outer support member 34 secured to the leg 24. The member 32 is pivotally disposed on a pin or bolt 36 which extends transversely through aligned holes in the box section 30 and the outer support members 34. An inverted, generally J-shaped bolster plate 38 is secured on each side of leg 24 between the leg and corresponding outer support member 34 in radial alignment with the corresponding pivotal member 32.

The pivotal member 32 includes an upper arcuate portion 40 which is at a given radial distance from the pivot axis and is rotatable relative to the bolster plate 38, and a diametrically opposed toothed portion 42 which is at a substantially greater radial distance from the pivot axis. Diametrically opposed, parallel portions 44 and 46 extend between the arcuate portion 40 and the toothed portion 42. Due to the generally larger size and greater radial distance from the pivot axis, the toothed portion 42 will normally assume a downwardly disposed position as generally shown in FIG. 5.

Figure 5:
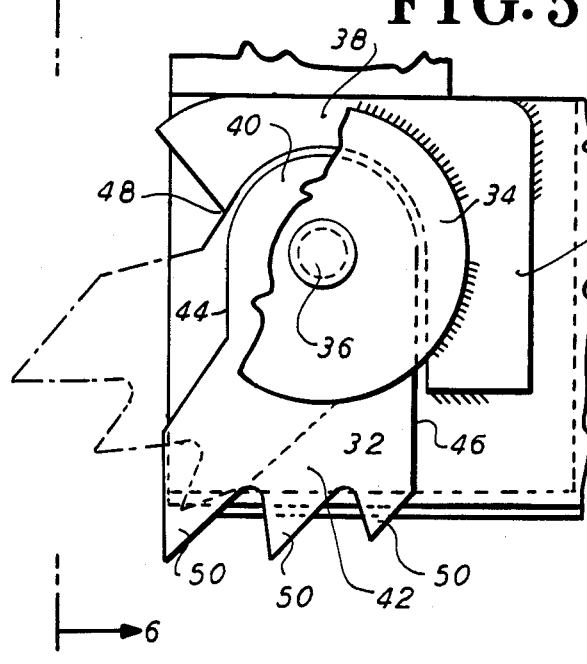
FIG. 5 is a detail view with parts broken away, of the floor piercing element in FIG. 4, the phantom lines show the toothed pivotal member in its retracted position relative to the floor.

The leg 47 of the bolster plate 38 generally precludes counter-clockwise movement of the pivotal member 32, as viewed in FIG. 5. As generally shown by phantom lines in FIG. 5, pivotal member 32 is clockwise rotatable at least until the straight portion 44 makes contact with the corner projection 48 of the bolster plate 38. It should be understood that the pivotal member 32 on the opposite side of the leg 24 is oriented as a mirror image on the pivot axis and would be reversely movable for a similar result.

In the normally assumed position for the pivotal member 32, the teeth 50 of portion 42 project downwardly (FIG. 5). When subjected to the weight of the load of the drums, the teeth 50 are driven to penetrate or pierce a wood floor 52a. When the drum retainer device is seated on the floor and out of service, the pivotal members 32 may be caused to assume the phantom line position of FIG. 5. Advantageously, the two teeth 50 seen at the right in FIG. 5 and in FIG. 2B as 50b may be alternately bent or "cocked" slightly with respect to the vertical or radial plane, one to the left, and the other to the right, e.g. by 15°. This introduces additional stability by giving the pivotal members a broader base for engagement.

With further reference to FIG. 5, it will be observed that in the normally assumed position of the pivotal members 32, the rearwardly facing edge of the teeth 50 extends vertically or nearly so. Under the severe demands imposed upon a loaded truck trailer 52 mounted for piggy-back service on a railroad car as shown in FIG. 1, the trailer and its cargo of drums may be subjected to impacts from the front and back, particularly during bumping or freight car sorting operations. Accordingly, a strap 54 is wrapped around the drums, the ends 56 of which are secured to posts 18 (FIG. 4) which restrain the drums from movement. (For simplicity strap 54 is not shown in FIG. 3).

Moreover, in the case of frontal impact, the teeth 50 with vertical or near vertical rearwardly facing edges, will substantially maintain position to keep the drums from moving toward the rear—the teeth 50 will thus keep the device 10 from moving toward the right in FIG. 4. In the, event of a rear impact on the trailer, however, the teeth 50 can more readily be dislodged forwardly to assume a new position. Thus, while some movement of the drums on the platform is permitted, the deck is firmly held. Should the strap break or not be fastened, shifting of the drums results in their sliding over the round forward ends of the legs 26 (or over the rounded edge 27 of the platform in FIG. 2A) without engaging any sharp edge which could damage the drums.

In the use of the drum retaining device 10, a fork lift unit is generally used and initially seats the drums on the retaining device from the front. After the drums are properly seated on the drum retaining device 10, the device with the drums thereon is picked up from the rear and moved into location. For the loading illustrated in FIGS. 1 and 1A, a pair of retaining devices 58 and 59 loaded with drums are seated in the trailer to secure the integrity of all drums in the forward direction between the retaining devices and the front end 51 of the trailer 52. As previously mentioned, one or more plywood or other temporary separating walls 53 are mounted between rows of drums to assure proper spacing and minimize the possibility of damage in the tightly packed drums. When necessary and/or desired, retainers 10 may also be used to generally preclude lateral movement as well.

While the present invention has been especially described in terms of specific embodiments thereof, it will be understood that numerous modifications will be apparent to those skilled in the art without departing significantly from the invention. Accordingly, the invention is to be broadly construed and limited only by the following claims.

We claim:

1. A device for storing and restraining barrel-shaped containers having at least one rim comprising:
   (a) a substantially-horizontal platform having a generally-continuous surface on which the containers can be placed,
   (b) a vertical frame at one end of the said platform;
   (c) means connected to said platform for spacing said platform a given uniform vertical distance from an underlying supporting surface; and
   (d) means extendable from below said platform for engaging and firmly gripping said supporting surface;
   (e) said horizontal platform being provided with an integral snub-nosed portion at the free edges of said platform, said portion being an extension of said platform projecting from said platform and curving smoothly about and extending below said horizontal part of said platform, and being retroverted but with said extension being spaced from said underlying supporting surface for said device; and
   (f) bent rod means extending between the forward ends of the retroverted extensions at the side edges of said platform and the retroverted extension at the forward edge of said platform, said retroverted extensions defining hollow spaces and the ends of said bent rod means being received in said spaces, whereby the rims of containers on said platform can slide over said platform edges without significant damage to the rims of said containers, and whereby containers not loaded on said device will be protected form damage.

2. A device in accordance with claim 1, wherein the means for engaging and firmly gripping the supporting surface comprise a plurality of serrated members, the teeth of which are adapted to pierce said supporting surface.

3. A device in accordance with claim 2, wherein said means spacing said platform from said supporting surface comprise a plurality of horizontal members underlying said platform and extending away from said vertical frame, said means for engaging said supporting surface being mounted toward the ends of said spacing members.

4. A device in accordance with claim 3, wherein said snub-nosed portion at the end of said platform remote from said vertical frame is comprised by at least a major portion of the edge of said platform.

5. A device for storing and restraining barrel-shaped containers, as claimed in claim 2, in which the serrated members are pivotable about an axis transverse to the spacing members.

6. A device for storing and restraining barrel-shaped containers, as claimed in claim 5, wherein each serrated member comprises a piercing element which is normally disposed to pierce the supporting surface when the restraining device is under load in service; said element being pivotable to a position incapable of piercing said support surface when said restraining device is displaced toward its edge opposed to said vertical frame, thereby permitting movement of said device toward containers placed on said platform toward said edge, to retain said containers between said restraining device and a spaced wall of a carrier vehicle.

7. A device for storing and restraining barrel-shaped containers as claimed in claim 1, which further includes restraining belt means secured to said vertical frame for restraining the containers receivable on said platform against said vertical frame.

8. A device for storing and restraining barrel-shaped containers, as claimed in claim 1, wherein said vertical frame comprises a plurality of spaced vertical members which extend upwardly from said platform at positions appropriate to enable restraining and supporting contact with said containers, said vertical members being at least the height of said containers, whereby to enable restraining and support along the entire height of the containers.

9. A device in accordance with claim 8, wherein said vertical members comprise two pairs of said members, said pairs being arranged in said vertical frame so that each of said pairs will be adjacent to the bearing surface of one of a pair of side by side containers bearing upon said vertical frame.

10. A device for storing and restraining barrel-shaped containers, as claimed in claim 1, wherein said vertical frame comprises a plurality of spaced vertical members which extend upwardly from said platform at positions appropriate to enable restraining and supporting contact with said containers, said vertical members being at least the height of said containers, whereby to enable restraint and support along the entire height of the containers and wherein said vertical members include to members arranged in said vertical frame so that each of said two members will be adjacent to the bearing surface of one of a pair of side-by-side containers bearing upon said vertical frame, and means defining a planar surface overlying said members for direct contact with said containers.

* * * * *